US008645995B2

(12) United States Patent
Ferris et al.

(10) Patent No.: US 8,645,995 B2
(45) Date of Patent: Feb. 4, 2014

(54) COMMUNICATION SYSTEM AND METHOD

(75) Inventors: Gavin Robert Ferris, London (GB); Peter Charles Florence, London (GB)

(73) Assignee: Logitech Europe S.A., Luasanne (CH)

( * ) Notice: Subject to any disclaimer, the term of this patent is extended or adjusted under 35 U.S.C. 154(b) by 256 days.

(21) Appl. No.: 11/982,554

(22) Filed: Nov. 2, 2007

(65) Prior Publication Data

US 2008/0134255 A1    Jun. 5, 2008

Related U.S. Application Data

(63) Continuation of application No. 11/484,555, filed on Jul. 11, 2006, now abandoned, which is a continuation of application No. 09/463,033, filed on Jul. 16, 2000, now abandoned.

(51) Int. Cl.
| | |
|---|---|
| *G06F 3/00* | (2006.01) |
| *H04N 7/173* | (2011.01) |
| *H04N 7/16* | (2011.01) |
| *H04N 7/00* | (2011.01) |
| *H04N 5/44* | (2011.01) |
| *G06F 15/16* | (2006.01) |

(52) U.S. Cl.
USPC ............. 725/37; 725/133; 725/136; 348/552; 348/734; 709/249

(58) Field of Classification Search
None
See application file for complete search history.

(56) References Cited

U.S. PATENT DOCUMENTS

| | | | |
|---|---|---|---|
| 4,703,359 A | 10/1987 | Rumbolt et al. | |
| 4,706,121 A | 11/1987 | Young | |
| 4,750,036 A | 6/1988 | Martinez | |
| 4,845,491 A | 7/1989 | Fascenda et al. | |
| 4,916,728 A | 4/1990 | Blair | |
| 4,941,090 A | 7/1990 | McCarthy | |
| 5,065,251 A | 11/1991 | Shuhart, Jr. et al. | |
| 5,101,267 A | 3/1992 | Morales-Garza | |
| 5,117,355 A | 5/1992 | McCarthy | |
| 5,202,826 A | 4/1993 | McCarthy | |

(Continued)

FOREIGN PATENT DOCUMENTS

| | | |
|---|---|---|
| DE | 19520754 A1 | 12/1996 |
| EP | 0972280 A1 | 1/2000 |

(Continued)

OTHER PUBLICATIONS

U.S. Appl. No. 09/463,033, filed Jul. 16, 2000, Ferris.

(Continued)

*Primary Examiner* — Jason J Chung
*Assistant Examiner* — James R Marandi
(74) *Attorney, Agent, or Firm* — Kilpatrick Townsend & Stockton LLP (57) ABSTRACT

A remote control device for consumer broadcast receivers, particularly television and radio receivers, is disclosed. In addition to the remote control features normally found on such a device, the device also contains a display on which advertisements, product and service offers, and other information (collectively, "display data") may be shown to the user. The device receives such display data via a radio link from one of a plurality of central processing stations. The user of the device may interact with such display data (for example, to purchase an advertised good), and the device may send back details of such interactions to a central processing station, which in turn may initiate a transaction with the appropriate sponsoring party.

22 Claims, 9 Drawing Sheets

(56) References Cited

U.S. PATENT DOCUMENTS

| | | | |
|---|---|---|---|
| 5,251,048 A | 10/1993 | Doane et al. | |
| 5,282,028 A * | 1/1994 | Johnson et al. | 725/139 |
| 5,287,268 A | 2/1994 | McCarthy | |
| 5,343,239 A | 8/1994 | Lappington et al. | |
| 5,410,326 A | 4/1995 | Goldstein | |
| 5,418,424 A | 5/1995 | Aprile et al. | |
| 5,479,268 A | 12/1995 | Young et al. | |
| 5,500,681 A | 3/1996 | Jones | |
| 5,510,828 A | 4/1996 | Lutterbach et al. | |
| 5,519,433 A | 5/1996 | Lappington et al. | |
| 5,603,078 A | 2/1997 | Henderson et al. | |
| 5,638,113 A | 6/1997 | Lappington et al. | |
| 5,646,608 A | 7/1997 | Shintani | |
| 5,661,517 A | 8/1997 | Budow et al. | |
| 5,695,400 A | 12/1997 | Fennell, Jr. et al. | |
| 5,710,605 A | 1/1998 | Nelson | |
| 5,721,584 A | 2/1998 | Yoshinobu et al. | |
| 5,734,413 A * | 3/1998 | Lappington et al. | 725/141 |
| 5,764,899 A * | 6/1998 | Eggleston et al. | 709/203 |
| 5,767,896 A | 6/1998 | Nemirofsky | |
| 5,786,814 A | 7/1998 | Moran et al. | |
| 5,790,974 A * | 8/1998 | Tognazzini | 455/456.5 |
| 5,796,832 A | 8/1998 | Kawan | |
| 5,800,268 A | 9/1998 | Molnick | |
| 5,806,065 A | 9/1998 | Lomet | |
| 5,809,204 A | 9/1998 | Young et al. | |
| 5,819,034 A | 10/1998 | Joseph et al. | |
| 5,831,664 A | 11/1998 | Wharton et al. | |
| RE36,116 E | 2/1999 | McCarthy | |
| 5,870,030 A | 2/1999 | DeLuca et al. | |
| 5,870,155 A | 2/1999 | Erlin | |
| 5,870,683 A | 2/1999 | Wells et al. | |
| 5,880,721 A | 3/1999 | Yen | |
| 5,880,769 A | 3/1999 | Nemirofsky et al. | |
| 5,900,867 A | 5/1999 | Schindler et al. | |
| 5,907,322 A | 5/1999 | Kelly et al. | |
| 5,907,350 A | 5/1999 | Nemirofsky | |
| 5,946,646 A | 8/1999 | Schena et al. | |
| 5,953,047 A | 9/1999 | Nemirofsky | |
| 5,956,025 A | 9/1999 | Goulden et al. | |
| 5,973,756 A | 10/1999 | Erlin | |
| 6,002,443 A | 12/1999 | Iggulden | |
| 6,002,450 A * | 12/1999 | Darbee et al. | 348/734 |
| 6,057,872 A | 5/2000 | Candelore | |
| 6,097,441 A | 8/2000 | Allport | |
| 6,130,726 A | 10/2000 | Darbee et al. | |
| 6,275,991 B1 | 8/2001 | Erlin | |
| 6,278,499 B1 | 8/2001 | Darbee et al. | |
| 6,292,283 B1 | 9/2001 | Grandbois | |
| 6,313,887 B1 | 11/2001 | Gudorf | |
| 6,327,459 B2 | 12/2001 | Redford et al. | |
| 6,369,693 B1 | 4/2002 | Gibson | |
| 6,469,633 B1 | 10/2002 | Wachter | |
| 6,484,011 B1 | 11/2002 | Thompson et al. | |
| 6,504,580 B1 | 1/2003 | Thompson | |
| 2002/0019985 A1 | 2/2002 | Fuccello et al. | |
| 2002/0059575 A1 * | 5/2002 | Watts et al. | 725/1 |
| 2006/0288374 A1 | 12/2006 | Ferris et al. | |

FOREIGN PATENT DOCUMENTS

| | | |
|---|---|---|
| EP | 0995313 A1 | 4/2000 |
| FR | 2738931 A1 | 3/1997 |
| GB | 2304217 A | 3/1997 |
| WO | WO 96/04635 A1 | 2/1996 |
| WO | WO 96/28903 A1 | 9/1996 |
| WO | WO 96/28904 A1 | 9/1996 |
| WO | WO 96/30864 A1 | 10/1996 |
| WO | WO 97/07632 A1 | 2/1997 |
| WO | WO 98/43158 A1 | 10/1998 |
| WO | WO 98/44477 A1 | 10/1998 |

OTHER PUBLICATIONS

Final Office Action for U.S. Appl. No. 09/463,033 mailed on Jun. 17, 2005; 7 pages.

Non-Final Office Action for U.S. Appl. No. 09/463,033 mailed on Jan. 12, 2006; pages.

Non-Final Office Action for U.S. Appl. No. 09/463,033 mailed on Apr. 23, 2004; 16 pages.

Non-Final Office Action for U.S. Appl. No. 11/484,555 mailed on Nov. 28, 2008; 8 pages.

International Search Report for PCT Application No. PCT/GB98/02152 mailed on Oct. 20, 1998; 4 pages.

European Telecommunications Standards Institute, "Radio broadcasting systems; Digital Audio Broadcasting (DAB) to mobile, portable and fixed receivers," ETS 300 401 [online], May 1997 [retrieved on Oct. 8, 2012]. Retrieved from the Internet<URL: http://www.rthk.org.hk/about/digitalbroadcasting/DSBS/DABETS300401.PDF>.

* cited by examiner

COMMUNICATION SYSTEM AND METHOD

This application is a continuation of application 11/484,555 filed Jul. 11, 2006 now abandoned, which is a continuation of application Ser. No. 09/463,033 filed Jul. 16, 2000, now abandoned.

The present invention relates to a communication system and method. The invention further relates to a transmitter apparatus and a receiver apparatus for use with the system and to a subscriber apparatus for communicating with at least one of the transmitter and receiver apparatus.

The invention may be applied to the field of remote control units for consumer broadcast receivers, including television and radio receivers. The invention relates to the display of (possibly programme-related) information, advertising, and product and service offers on said remote control units. The invention provides use of said units to allow consumer response to the said displays, particularly but not exclusively where said response involves the purchase of said products and services so offered.

It is commonly known in the advertising, sales and marketing arts that users are much more likely to initiate an impulse purchase of information, products and services (collectively, 'offerings') if:
1) they are induced to think about said offerings in a positive manner shortly prior to the offer of sale,
2) an offer of sale is, in fact, made and
3) it is fast and easy for users to place orders for such offerings, once the offer of sale has been made.

Broadcast media, such as television and radio, often satisfy the first condition for many offerings. For example, upon hearing a track from an album on the radio on the radio, a listener will commonly wish to purchase that album. Similarly, upon watching a cookery programme on television, a viewer may wish to purchase a bottle of wine reviewed therein. Indeed, condition 1) forms a key premises of many television shopping channels, infomercials and commercials in the United States and elsewhere.

Unfortunately, however, condition 2) is often unsatisfied, as, for example, when a radio station does not broadcast the name of the artist and album of the current song, or where (as in the cookery programme example) there is no provision to phone in orders (which is a costly enterprise for the broadcaster to maintain). Many commercial opportunities to make a sale are lost in this way.

Furthermore, even when 1) and 2) are satisfied (as with a television shopping channel), it is usually the case that 3) is not. Users who might initially be keen to purchase an offering become less so when such purchase involves location of a credit card, phoning up, waiting in an answering system, and then having to give a number of lengthy details. Lack of convenience acts as a strong barrier to sales.

Various solutions have been proposed in the art to the various problems of 1), 2) and 3). However, a good, economical solution has not yet been offered to all three.

U.S. Pat. No. 5,410,326 (Goldstein) describes the use of a universal remote control device with a built in display on which advertisements can be shown. The system does allow purchasing; however, this requires the use of a phone modem, which is highly inconvenient, and also, since the system connects directly to the sponsoring party, may require direct data handling for which that party is not equipped. Furthermore; downloading data into the device requires either the use of the said modem, a set-top box adaptor (to gain access to in-band or out-of-band Programme Associated Data (PAD)), an optical device to 'read' information off the television screen, or an audio device to detect information hidden in audio signals.

The disadvantage of using the phone modem to download PAD is clear, in that a call must be made, which is inconvenient, and since there is both a limited memory in the device (limiting the amount of static information which can be downloaded) and occasions when the PAD will be highly volatile and not known ahead of time (as with sporting events), the solution is not general. The disadvantages of using a set-top box, namely cost and complexity, are easily understood, as are the difficulties suffered by 'data-hiding' or visual indicia systems (low code rate, low reliability). Therefore, while this device has some promise, it must fall down in being manifest either as a workable but very expensive unit, or a mid-priced but less than useful one.

It is, accordingly, an object of the present invention to provide an economical channel for at least one of outgoing or incoming information, avoiding the disadvantages of the channels currently in use in the art, for the transmission of interaction data to or from the instant device.

According to a first aspect of the present invention, there is provided a communications apparatus comprising means for determining whether a broadcast receiver is receiving a particular channel, the apparatus further comprising receiving means for receiving a signal, means for displaying information in response to a signal received by the receiving means, means responsive to a user input to provide an outgoing signal and transmitting means for transmitting the outgoing signal, wherein at least one of the receiving means and the transmitting means is for communicating by radio with a remote station responsive to outgoing signals from a plurality of communications apparatus.

According to a second aspect of the present invention, there is provided a transmitter apparatus comprising means for storing information concerning transmission from a primary broadcaster, means for transmitting the information and means for synchronising the transmission of information to at least one transmission from the primary broadcaster, wherein the means for transmitting information transmits distinct from the primary broadcast chain.

Looking generally at the issue of presenting programme-related offerings to a user via an apparatus, one can see that there is a need to have an outbound channel, holding the programme-associated data, which is broadcast to the user in parallel with the programme channel, and which is picked up by the said apparatus. However, as we have seen, current mechanisms for sending offering-related PAD requires that the data be sent in the same medium as the programme, which in turn requires either a costly set-top box decoder, an unreliable (and broadcaster-tied) 'data-hiding' decoder, or the duplication of the receiver circuitry in the receiver, which would also be very expensive. Broadcast of PAD using other channels either has significant drawbacks (as with the use of telephone channels, which are inconvenient, non-broadcast, and not amenable to 'real-time' PAD), or has not yet been applied to the distribution of offering-related PAD (as with the systems which use the pager network as a transport).

The present invention may further provide an offering-related PAD broadcast channel which can be received by a device without the use of a set-top box, telephonic modem, or other external inconveniences, and which does not rely upon to co-operation of anyone in the primary broadcast chain to insert information (whether using out-of-band, in-band, using data hiding or otherwise) into the programme broadcast medium.

Similarly, it may be appreciated that such a device, if it is to allow useful purchasing and information request actions by customers, must supply a (relatively low-capacity), real-time back (or return) channel, to allow interaction data to be conveyed to the sponsoring party. Such a back channel must be initiated on a individual basis, as opposed to the broadcast nature of the outbound channel. Existing systems rely on back-channel paths with are either inconvenient (for example, telephonic modems), require the use of a costly set-top unit (for example, those which exploit the cable system as a return path), or are not 'real time' or close to 'real time' (as with systems which must be taken to a 'downloading' point to extract any interaction data stored in them). Current systems also connect the back channel of the user's system directly to the sponsoring party, thereby requiring that the latter be equipped with whatever handling equipment may be necessary; another potential hurdle to take-up.

Notice that such a device, if it is to be generally useful, must be able to receive PAD items in an ongoing feed. There are two main reasons for this. First of all, the fact that any reasonably-priced embodiment of such a device can have only a modest amount of onboard memory, places a limit on the number of PAD items that can be downloaded to it in any given batch mode transfer. Second, for certain events, such as televised live horse races, the outcome is not known in advance, and so neither, a fortiori, is the content of any event-related PAD. Such PAD cannot, therefore, be downloaded in advance of the event using a batch mode transfer.

These two factors, namely limited buffer memory in the device, and the dependence of certain PAD items on live events, means that the ongoing feed of PAD to the device must take place in "real time" or close to "real time". "Reel time" feed is required in the second scenario mentioned, where PAD content is contingent upon an event, the outcome of which is unknown until the time of broadcast. Once the event in question is determined (for example, a particular horse wins the race), the relevant PAD may be constructed and is then immediately due for presentation to interested users. Ideally, as little additional delay as possible is incurred from this point on; hence the term "real-time". Near "real-time" feed is required in the first scenario, where PAD items transmitted to the user device must be relevant to a primary broadcast within the near future, if buffer overflow in the device is to be avoided.

The present invention allows the passage of such data to sponsoring parties to be directed via a central processing station and require only the use of standard, well-known protocols for any communication between said central processing station and said sponsoring parties.

The present invention may further allow the presentation to users—through a cost-effective, single device—of programme-associated data, particularly where such PAD constitutes an offering, and to allow the user to express interaction with the PAD through the device, particularly where such interaction consists of the purchase of said offerings.

The present invention may further allow such PAD to be 'real-time' or 'near real-time', and for the interaction data to be conveyed back to the sponsoring party in 'real-time' or 'near real-time'.

The present invention may further provide a solution to the problem of satisfying conditions 2) and 3) mentioned above, (given that condition 1) is already satisfied by the primary broadcast material), in the form of a simple user device, a plurality of which may be in operation at any time, remote adaptor station or stations, and methods.

In accordance with the aforementioned and other objects of the invention, a brief summary of the present invention is given. Some simplifications and omissions may be made in the following summary, which is intended to highlight and introduce some aspects of the present invention, but not to limit its scope. Detailed descriptions of a preferred and other exemplary embodiments adequate to allow those of ordinary skill in the art to make and use the inventive concepts will follow in later sections.

The present invention provides apparatus and method for providing simple, efficient and economic display of advertisements, product and service offers, and other information (collectively, 'display data') to the users of broadcast receivers, and is intended to have particular application where said display data is related to the programmes picked up by such receivers. The invention also provides apparatus and method for users, where applicable, to interact with said display data (for example, to order an offered product, or to request more information about an advertised good or service), and for the details of such interaction (collectively, 'interaction data') to be sent back to the sponsoring party for processing.

The apparatus, for example a remote control can determine whether a channel is selected on a broadcast receiver. In the case of a remote control this can be by way of selection by a user. A confirmation of the correct channel can be obtained by receiving a signal from the broadcast receiver, for example using a microphone and comparing the signal with a predetermined signal or a signal received at this apparatus.

However, the device may also contain a radio data receiver, which is used to pick up display data relevant to the programme that the user is currently watching (or listening to). The device is able to filter this incoming data according to the current <medium, channel> pair, which is known to the device.

Incoming display data is stored in memory within the said device until it becomes eligible for display. Generally, such data will be timed to become eligible for display at a point when the programme on the associated channel contains relevant content, (thereby satisfying condition 1) mentioned in the background section); in such a circumstance the display data may be termed programme associated data, or PAD, and the point in time of activation is known as the cue point. The list of PAD items and associated cue points, for each programme broadcast on a given channel (which can include infomercials and commercials, for our purposes) must be provided to a central PAD scheduler, either ahead of time, just in time, or some combination of both. The scheduler co-operates with a database system to hold this list, and, at the appropriate point (either ahead of or at the cue point), passes the next due PAD item, including its cueing information, through to a radio transmission system, which it turn sends it to users' handsets, as rehearsed above.

When a PAD becomes eligible for display and is present in the memory of the said remote control device, it will be caused to be shown on the display of said device, possibly accompanied by certain event indications (such as an audible alarm or flashing lamp).

Various sorts of input signal may be utilized by such a device. For example, a serialized PAD software object may be sent, comprising a program, associated state, unique identifier (PADUID), relevant <medium, channel> specification, and a triggering (cueing) time specification. Control messages may also be sent, to cause PAD items buffered in any appropriate receiving device to be rescheduled, edited, deleted or otherwise manipulated. Simple trigger signals may be sent, to cause any appropriate receiving device to perform some preset operation. Configuration information may be sent (including software updates for the main device operating routines). "Pure" data may also be sent, devoid of any executable content, such data to be interpreted (and possibly displayed) by software routines resident in any appropriate receiving device.

If the user desires (and the PAD is of a nature so to permit), s/he may interact with the display data by operating controls on the said device. Through this mechanism the user may traverse through a structure of displays, or modify state information associated therewith, under the control of a flow control program embedded in the display data. The user may also move backwards and forwards through the set of display data items which has been received (bounded by the size of the memory) if desired. If a user is particularly interested in a unit of display data, s/he may cause said unit to be stored in non-volatile memory on the said device, from where it may be retrieved by the user for processing at a later time. In normal circumstances, any given unit of display data is eventually evicted from the memory of the device by an incoming unit; this will happen whenever the display data memory is full and the given unit is deemed least eligible to be retained, under some appropriate metric.

User interactions with each unit of display data are stored, and the flow control program contained with each unit may specify at which point (if at all) such interaction data should be forwarded to the sponsor of the display data. When this point is reached, a radio data transmitter in the device is used to send the interaction data back, via a radio service provider, to the central processing station. Here, it is fed into an interaction processor, which is responsible for providing the appropriate response. This may involve initiating a transaction on behalf of the user, possibly via an Internet gateway to the appropriate sponsoring party, requesting that the sponsoring party send more information, logging the interaction in a user database, performing a financial transaction, or otherwise.

In response to the interaction data so transmitted, it is possible for the interaction processor to send back data for the individual consumption of the display data program that initiated the transmission of the interaction data in the first place. This mechanism may be used, for example, to confirm that an order has been received and will be processed.

The central processing station mentioned above may be part of a large network of such stations, which may be arranged in such a manner as to provide transparent 'fail-over' of the transactions of one processing stations to others.

When a transaction is performed using the handset, details of that transaction are stored in non-volatile memory, and a set of the most recent transactions may be displayed to the user on demand. A full record for each user is stored at the central processing station handling that user, and may be downloaded to the handset on demand.

From a user's perspective, the device allows an easy, cheap and hassle-free entry into the world of interactive broadcasting. Services which may be offered include programme-associated selling, schedule information, betting, advertisement follow-up, voting, competitions, audience demographic measurement, interactive story lines, and many others.

Figure 3:
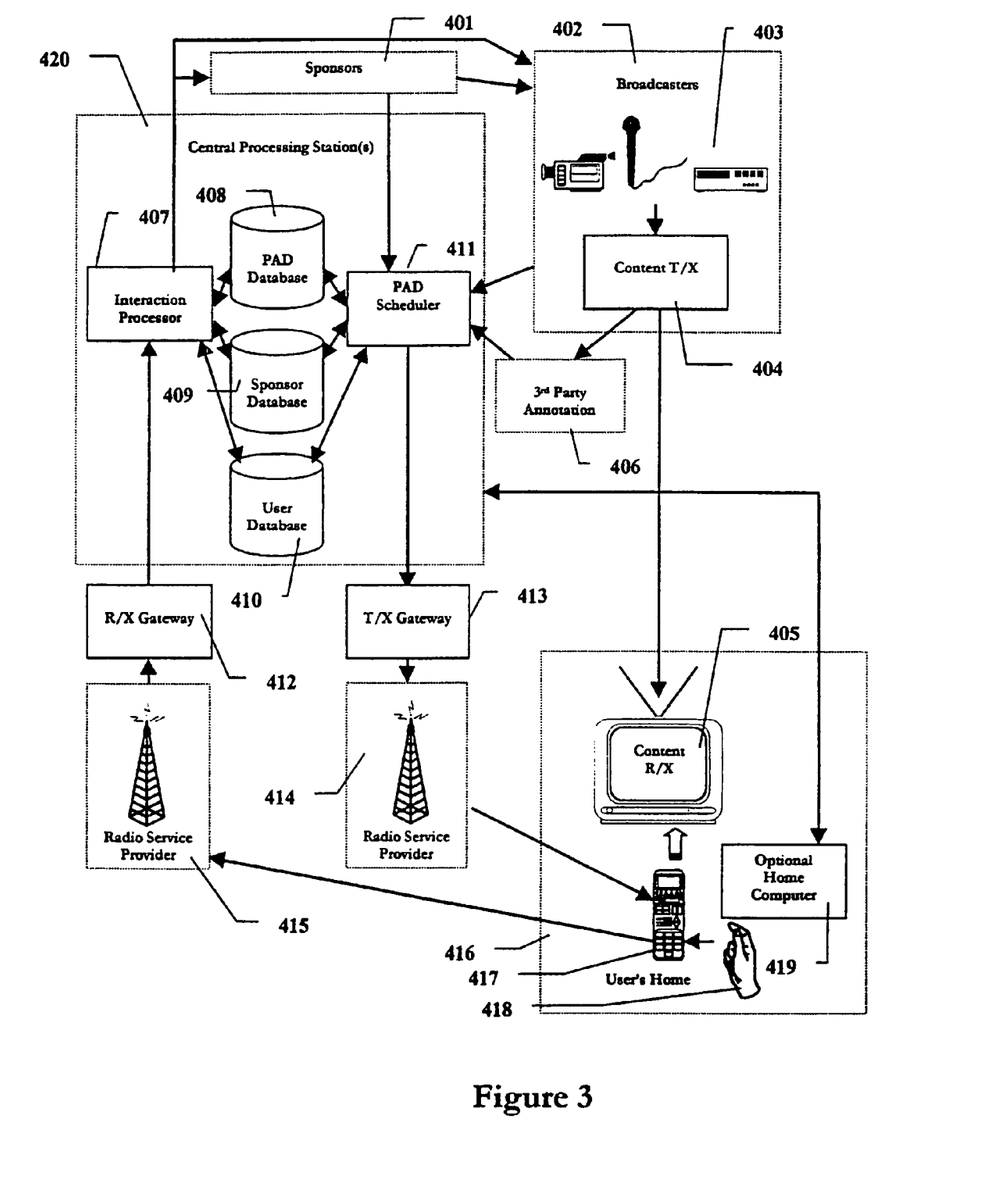
FIG. 3 is a functional block diagram of an interactive system having a preferred embodiment of the present invention.

The present invention will now be described, by way of example, with reference to the accompanying drawings, in which:

FIG. 3 is a functional block diagram of an interactive broadcast system embodying the principles of the present invention. The system of FIG. 3 is intended to serve as an example and should not be construed as limiting the invention.

Broadcasters 402 generate content from a number of sources 403, depending on the broadcast medium in use. For example, a television broadcaster might utilise live feed from video cameras, and video played from tape, as primary sources. Commercial broadcasters will also have programmes and segments (such as infomercials and commercials) provided by sponsors 401, for insertion. In the normal course of events this combined content stream is fed into a transmission mechanism 404 for broadcast to into a user's home 416 where the content carrier is acquired and the content reconstructed and displayed using a broadcast receiver 405. Said transmission mechanism may involve terrestrial radio-frequency broadcast, satellite radio-frequency broadcast, or wired or fibre optic cable transmission, or otherwise. The overall path and system, by means of which content is disseminated from broadcasters 402 to broadcast receivers 405 in users' homes 416, is termed the primary broadcast chain.

For the system of the instant invention to operate, as mentioned above, a rolling 'play list' is compiled for each broadcast channel, containing the PAD display data records and their respective cue points. This information is fed, whether well or only very shortly in advance of the earliest cue point in the segment of the rolling list passed at that time, to a PAD scheduler 411 at a central processing station 420. Such a list may be provided by any combination of the sponsors 401, the broadcasters 402, or by some third party 406 which annotates programmes, either as these programmes are broadcast or ahead of time. The use of third party annotation may be useful where a broadcaster does not wish, or is not correctly placed, to co-operate with the display of programme-associated information. There are a number of circumstances where this might be appropriate; for example, local advertising, advertising making use of products appearing in a feature film, betting on the outcome of events, such as sporting events, and so on. Furthermore, the circumstance may arise, where a sponsor, for example, has an advertisement produced, but does not know at which time such this advert will be shown. In such a case, the transmission signal of the broadcaster in question may be monitored to detect the said advertisement at which point any PAD for that advert may be instantly cued.

In one envisaged embodiment of such a monitoring system, each central processing station contains a database of various audio and/or video samples (supplied ahead of time) taken from the programmes (including advertisement and infomercials) which are to be augmented with data. A matching engine then continuously compares input from the various broadcast channels with these samples, and uses a commonly known algorithm (such as a sliding-window, averaged, square-of-difference system with an activation threshold) to determine when a 'match' has occurred. Such a system may be utilised to determine that a piece of annotated content is being broadcast at a certain time on a particular <medium, channel> pair, which may in turn allow the scheduler to verify or regain its synchronisation lock for the PAD items for that content. Through the transmission of special control messages, PAD items already sent to user devices may be rescheduled or deleted, without the main body of the message having to be retransmitted.

The possibility of maintaining multiple, alternative lists of PAD items for a given <medium, channel> pair is acknowledged here, with selection of the appropriate list or lists at the user device; however, the primary focus in this exposition will be for the simpler case of a single 'cue list' per pair.

When the next display message is due to be transmitted, as may be detected at the PAD scheduler 411 using either a polling or, preferably, an interrupt mechanism, it is retrieved from a PAD database 408, given a unique identification number (PADUID), and sent to a transmission gateway 413, which may be physically remote, where it is translated into the correct format to be sent over a radio transmission service 414. In the preferred embodiment of the present invention, the PAD would be sent using the text message transmission protocols of a cellular paging system, with a virtual 'recipient address' identified with the pair consisting of the medium and content broadcast channel in question, but other formats are obviously possible. For example, the outbound PAD could be transmitted using 'data-hiding' technology over an existing radio broadcast channel, or sent on a dedicated data radio channel, or otherwise.

From the gateway, the radio service provider 414 arranges for the transmission of the information over the service 414. In the preferred embodiment this involves sending the message using a cellular network of paging transmitters.

The message is received in a given user's home 416 by receiving apparatus 417, which in the preferred embodiment, is a remote control device for said broadcast receiver 405. In the preferred embodiment, the said remote control device 417 will contain a two-way paging chipset to allow reception and transmission of digital information in a ubiquitous and cost-efficient manner. The user 418 utilises the remote control device 417 to select the channel to receive at any given time on a given broadcast receiver 405, and this allows the device 417 to select the appropriate stream of incoming PAD items. In the preferred embodiment, the selected channel and receiver uniquely specify a virtual 'paging user id' to which the said two-way pager chipset may be set to be responsive.

In an alternative envisaged embodiment, data is transmitted to the device using a radio subcarrier scheme, such as is provided by the SCA system in the United States. In another envisaged embodiment, the data transport mechanisms of the Digital Audio Broadcasting (DAB) system are used to transmit information to the device (as defined in ETS 300 401— "Radio Broadcasting Systems; Digital Audio Broadcasting (DAB) to Mobile, Portable and Fixed Receivers").

The internal configuration of the remote control device 417 will be described later. For now, simply note that the device 417 will display the incoming PAD display data to the user at the appropriate cue point, and may accept interaction from the user on the basis of the information so displayed. Details of such interaction, where relevant, may be transmitted back to the central control station 420, together with the unique handset/user id (HUUID) and PADUID of the initial display data.

In the preferred embodiment, encoding and transmission is performed by a two-way paging chipset in the remote control device, and picked up by the local cell receiver of a co-operating paging service operator. However, other arrangements for reception of the return radio signal are possible.

For example, the system may make use of bandwidth available within a digital cellular telephony system, under some appropriate protocol (e.g. the Short Message Service of GSM). Alternatively, the signal may be sent into an unlicensed radio data network, for example, a metropolitan packet-relay system.

In any event, the return signal is picked up by the receiver network 415 of a radio service provider (which may or may not be the same as provider 414), and forwarded to a reception gateway 412. This gateway formats the interaction data in a manner suitable for processing by the rest of the system, and arranges for the translated message to be transported to the appropriate central processing site 420, which may be physically remote.

At the central processing site, the forwarded message is received by an interaction processor 407, which decodes and processes the interaction data. It makes use of the PAD database 408, in conjunction with the enclosed PADUID. The enclosed HUUID is used to look up the user's record in a user database 410. Security mechanisms are incorporated into the message sent from the handset 417 to prevent fraud.

There are a number of possible operations available to the interaction processor upon receipt of a message, and the use of a plug-in architecture here allows this set to be extended at will. Indeed, a separate handler may be registered for each PAD, if desired. In any event, certain common actions will be possible. For example, the user's credit card details may be held in the user database 410 (indeed, if the remote control device is sold to the user by credit card, then this information will be immediately available after the sale), and used, in conjunction with the offer details from the PAD database 408 and vendor details from the vendor database 409 to formulate a financial transaction request, which may then be forwarded to the sponsoring party in question 401. This forwarding may utilise such transports and protocols as are known in the art, and may interface to existing systems installed by the sponsor; for example, the request might be sent over the Internet, using the Secure Electronic Transactions (SET) protocol. Alternatively, the interaction might constitute a request for further information, in which case the sponsor will be so informed. Here, a convenient format may be a 'virtual hit' on the sponsor's Internet Web site, suitably tagged so that the sponsor is aware of the mechanism through which the interest has been channeled. In yet another common transaction, details are passed back to broadcasters 402, allowing the production of genuinely interactive broadcasts—for example, by allowing feedback voting on a talent contest, or program story line selection.

Through use of an optional home computer 419 connected to the appropriate central processing station 420 over a known transport, such as the Internet, users will be able to review the transaction histories held in the database 410, and have access to all the facilities offered by the handset 417, but in greater detail and with full graphical support. It should be noted that use of a home computer 419 is not necessary to the operation in the main of the present invention.

As the user's name and address is held in the user database 410, the process of purchasing, or requesting the mail-out of information, is greatly simplified.

Figure 1:
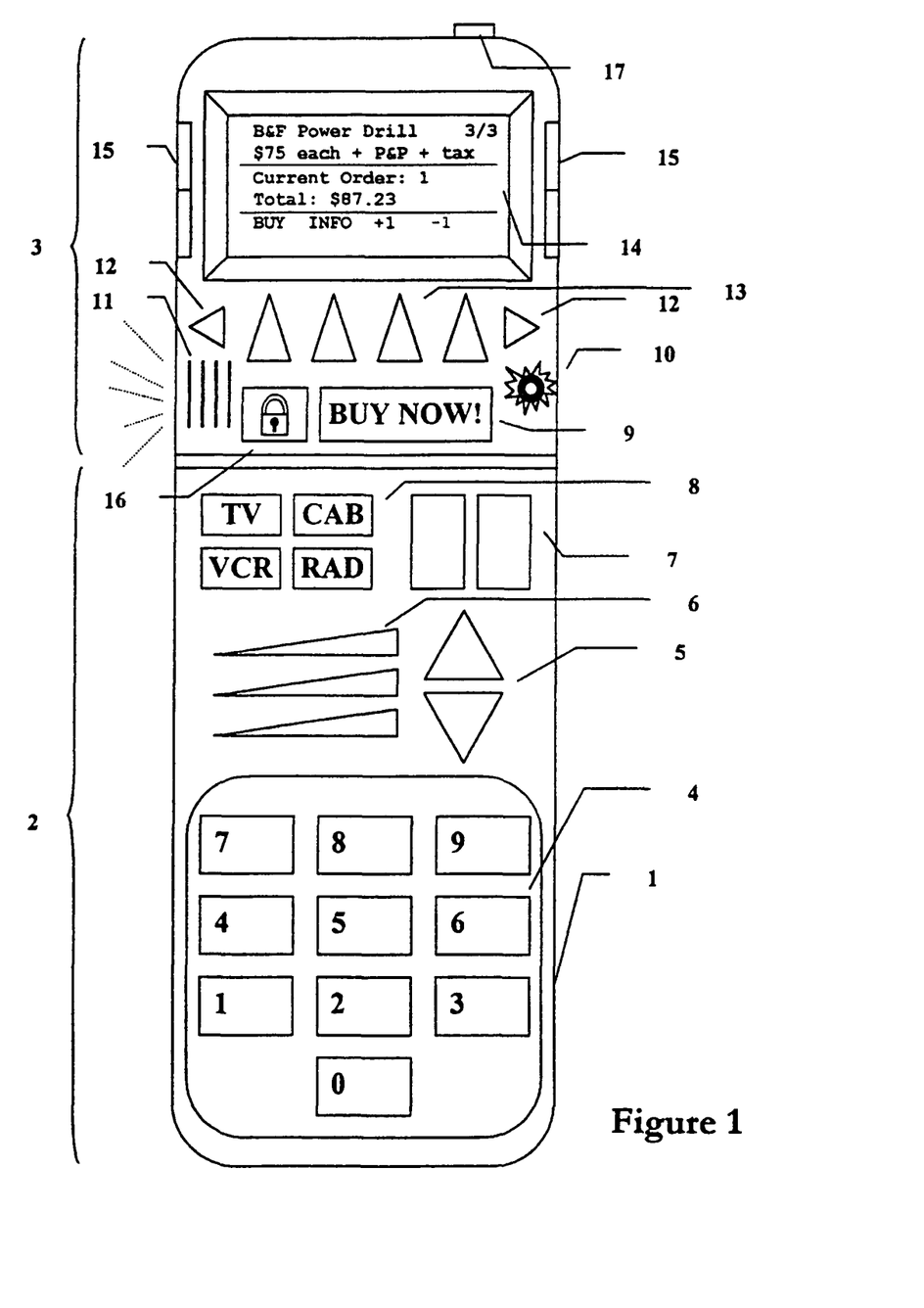
FIG. 1 is a plan view of one embodiment of the remote control apparatus of the present invention.
Figure 5:
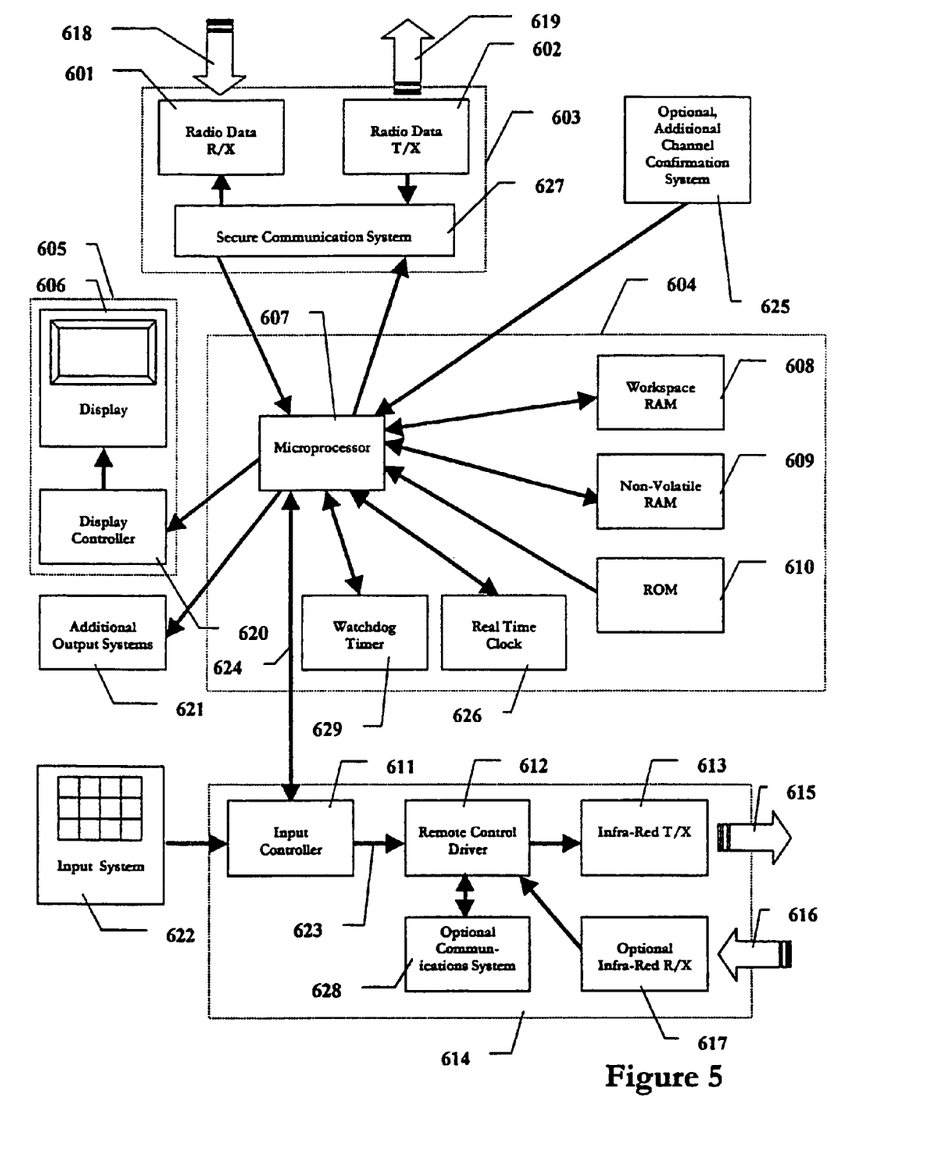
FIG. 5 is a functional block diagram showing the major components of one embodiment of the remote control device of the present invention. Only the major data flows are show; minor control flows are not.

FIG. 5 is a functional block diagram of an embodiment of the remote control handset according to the instant invention, and FIG. 1 is a plan view of one embodiment of such a handset.

Turning first to FIG. 5, we see that the user of the handset provides input to the device via input system 622, which in one preferred embodiment consists of a set of keys. This input is supplied to the core of a conventional remote control system, 614. This core system may be of any of the configurations well known and rehearsed in the art, such as vendor-specific, universal, learning, programmable, or otherwise. It consists of an input controller, which decodes the data from said input system 622, and invokes the appropriate response in the remote control driver 612. This driver will contain such means, well known in the art (e.g., ROM lookup tables, non-volatile RAM for 'learnt' configurations, etc.), as are necessary for the operation of the device as a remote controller of the required type, and will be connected to infra-red transmitter 613. This will provide an infra-red signal 615, coded appropriately by 612 in response to the user input from input system 622 as detected by the input controller 611, which, in turn, will drive the remote consumer device (such as a broadcast receiver, VCR, etc).

Depending on the type of remote control device desired, various optional modules may be added to the remote control core 614. For example, a 'learning' remote control would need to have an infra-red receiver 617 connected to the driver 612, in order that inbound infra-red signals 616 from (e.g.) a target handset could be recorded. Similarly, a 'programmable' remote control may require a communications system 628 to allow the appropriate vendor-specific codes to be downloaded from a remote site upon request. According to one preferred embodiment of the present invention, this functionality of system 628 may be provided as a secondary function of the radio data transceiver 603 (described below).

As well as feeding the driver 612 via output 623, the input controller 611 also passes details of the invoked commands to the main processing system 604 within the handset via output 624. This processing system is responsible for dealing with the reception, storage and display of incoming display data, and also handling any interaction with said display data from the user, including (where necessary) causing any resulting interaction data to be transmitted back to the central control system 420.

The main processing system 604 contains a microprocessor 607 (which executes the software components of the user-side system), a real-time clock 626 used to determine (inter alia) when the cueing point of PAD items has been reached, a watchdog timer 629 to reset the system should it become locked up for whatever reason, and various memory components. The latter may be split into: workspace random access memory (RAM) 608, used to hold the ephemeral running state of programs executing on the microprocessor 607, non-volatile RAM 609 used to hold configuration information which must not be lost upon power loss (such as, possibly, HUUID information, purchase records, display data that the user has requested be stored, and possibly system software or patches), and finally, read-only non-volatile memory (ROM) 610, used to store non-changing information in the system, such as core system software routines.

According to one embodiment of the current system, the functions of all or part of the entire system 604 are provided by an appropriately chosen microcontroller, to reduce cost.

According to another embodiment of the current system, either or both the input controller 611 and the remote control driver 612 are provided by the said microcontroller also, to reduce cost.

The software running on the microprocessor 607 has the responsibility of storing display data pertaining to the currently selected channel of the currently selected broadcast receiver. The microprocessor 607 knows which is the currently selected channel, because it monitors the data 624 sent from the input controller 611; when a channel change is detected, the new <medium, channel> pair is stored in the non-volatile RAM 609. The system software is so arranged that, as soon as may be practicable after the user switches on a broadcast receiver using the device, the microprocessor sends an output along the bus 624 to the input controller 611, to force the transmission of an appropriate infra-red code to the said receiver, to force the selection of a known starting channel.

During operation, the microprocessor 607 may obtain extra information and confirmation about the current <medium, channel> pair, through the optional additional channel confirmation system 625. According to one embodiment of the current invention, this is provided by a microphone and analogue-to-digital (A to D) converter, together with a system which periodically receives a set of expected amplitude value ratings for each <medium, channel> pair from the radio transceiver system 603, and provides a running best match between these using such value-set correlation mechanisms as are well known in the art, such as a sliding-window, averaged, square-of difference system with an activation threshold.

The currently selected <medium, channel> pair affects what information is accepted by the microprocessor from the radio transceiver system 603. According to the preferred embodiment, this will involve sending a control instruction to the pager reception circuitry to make it sensitive only to messages with the appropriate 'virtual' pager user id, corresponding to the said pair.

The radio transceiver system 603 is the main method by which the device communicates with the appropriate central processing station 420, as discussed above. Inbound messages, transmitted as radio signals 618, are picked up by the radio data receiver 601, which functionality in the preferred embodiment will be provided by the reception portions of a two-way pager chipset. Said messages are then passed through the message security system 627, to ensure that they are legitimate. In one embodiment, this process involves decrypting said inbound messages according to a public key algorithm. In another embodiment, it involves comparing a stated checksum on said inbound messages with the same checksum computed dynamically.

Any messages which are picked up and successfully validated by the radio transceiver system 603 are fed to the microprocessor 607, where their <medium, channel> pair is checked against that stored in the non-volatile RAM 609. Those messages which do not match are discarded, whereas those which do match are placed into a buffer in the workspace RAM 608. This buffer clearly has a limited size, and, when the buffer is full and a new message comes in, the PAD item (message) in the buffer with the cue point furthest away from the current time is discarded. Where possible, items which have interactive data stored are not discarded until either a timeout period elapses or the transaction is completed (in which case a summary may be written to the non-volatile RAM 609, and the item discarded if necessary). In the case of a tie, one PAD item is discarded at random. PAD items in the buffer are held in order of cue-up time.

In an envisaged extension to the system, sufficient memory is provided that PAD items for a number of <medium, channel> pairs may be accumulated, not merely the currently selected pair, allowing for information to be instantly available even when the user skips to a new <medium, channel> pair. The device may keep a record of the most commonly accessed <medium, channel> pairs in non-volatile RAM 609, to help decide upon which PAD items to record.

Each inbound message carries a timestamp which is set at transmission; this allows the real time clock 626 to be accurately maintained in synchronisation by the processor. When the device is used for the first time, messages for any <medium, channel> pair are accepted, in order to quickly acquire an accurate timestamp to initialise the real time clock 626; however, said messages are not retained or displayed unless they do match the current pair.

In another envisaged extension to the system, PAD items contain additional descriptive information—metadata—which allows them to be selectively retained and displayed according to the profile of each particular user. This profile, which may be held in the non-volatile RAM 609, may be used to match PAD to users on criteria such as age, sex, geographical location, and so on.

In yet another envisaged extension to the system, the profiles of users are held, and may to some extent be generated, at the central processing site (420 in FIG. 3). These profiles, stored in the user database (410 in FIG. 3) are matched against metadata-tagged PAD items in the PAD database (408 in FIG. 3). A matching list of users is compiled, and this information (in the form of unique user ids) is appended to the appropriate PAD items prior to transmission. Upon reception at a device, the currently active user id is matched against the said list of users, and only those PAD items which do match are retained and displayed.

Special control messages may also be used, which will force the message corresponding to a specified PADUID to be flushed from the memory of receiving devices, or undergo modification of various types, including change of cue-up time.

The cue point for each PAD item is also specified as a real time point, with an optional special case of 'display immediately' which may be relevant in certain circumstances. The system does not require that PAD items be transmitted from the control centre in the order that they are to be displayed, since this is controlled by the aforementioned cue-up point.

The microprocessor 607 is responsible for initiating a display routine for each PAD item as its cue-up point is reached by the real time clock 626. It will detect such an event either through the use of an interrupt created by the real time clock 626, or by continuous polling. The former mechanism is to be preferred where possible. It may also invoke additional output systems 621 to attract the user's attention to the new display data. In the preferred embodiment of the current invention, such additional output systems will include a piezoelectric buzzer, and a flashing LED. The user may disable these systems if so desired.

The display routine executes the program unit associated with the appropriate PAD item. (In this sense, we may regard the display data as being an object, on which a 'display' method is invoked.) This program unit may make use of a set of core library routines stored in either or both of the ROM 610 and non-volatile RAM 609, to assist its operation. The microprocessor executes display routines using a pre-emptive strategy, to prevent the device becoming locked up due to an endless loop bug in such a routine. The watchdog timer 629 will reset the microprocessor should a bug in the display routine (or some other problem) cause the system to lock up.

To actually generate a display on the device, the display routine of the active PAD item may call various utility library routines, which cause the microprocessor 607 to issue commands to the display system 605. This system contains a display controller 620, responsible for translating the high-level commands sent from the microprocessor 607 into whatever low level display control signals may be required by the actual display system involved 606. In the preferred embodiment of the current invention, the display is rendered as a multi-line pixel-addressed LCD screen.

Other library routines available to an executing display routine provide (inter alia) read and write access to the various memory stores (608, 609 and 610) of the device, allow data to be passed to the input controller 611 via the bus 624, and allow messages to be sent back to the main control centre (and so, possibly, to a sponsoring party, a broadcaster, or otherwise). This latter functionality causes information to be sent to the radio data transmitter 602 of the radio transceiver system 603, having first passed through the message security system 627. According to the preferred embodiment of the current invention, this will involve providing at least a checksum for non-critical outgoing messages, and public-key encryption for critical messages, together with a message digest generated using a special key which makes use, in cyclical series, of a unique list of values held within the non-volatile RAM 609 of the device installed at manufacture and modifiable at later times. Messages are sent from the device using radio emissions 619.

Routines will also exist to allow the display routine to receive information back from the appropriate main control centre in response to a message sent; this cyclical process may continue for as long as necessary. Using further library routines, a display routine may notify the system that the user's interaction has reached a logical ending point, which will allow the PAD item to be flushed if required.

Figure 6:
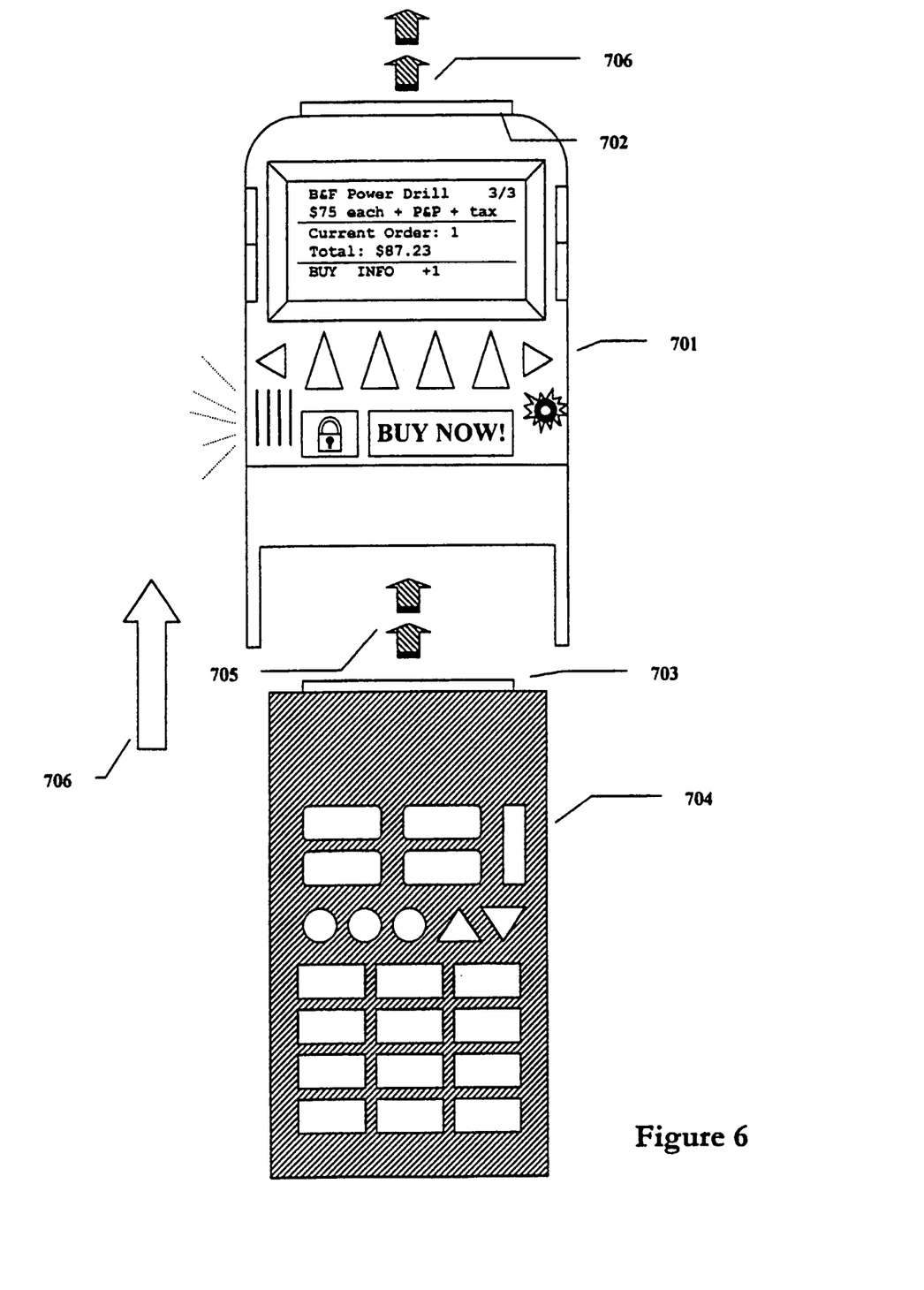
FIG. 6 is a plan view of an alternative embodiment of the present invention, as a "pass-through" adaptor that may be attached to an existing broadcast receiver remote control handset.

Turning now to FIG. 6, we can see an alternative embodiment of the current invention in which an adaptor unit 701, providing the facilities of the interactive set of controls (3 on FIG. 1) found on the preferred embodiment discussed earlier, can fit over a user's existing remote control unit 704. The "host" handset 704 contains, inter alia, an infra-red transmitter 703, which emits control signals 705 in response to user input. The adaptor unit 701 is so designed that the emitted signals 705 are passed through and permitted to emit from window 702 as signals 706. However, the device 701 also contains an infra-red receiver, which samples the signal 705, allowing the unit to identify the control signal which is being sent. When the control signal represents a command to change the current <medium, channel> pair, the device 701 switches its PAD display and reception accordingly. The adaptor and host handset are shown in "exploded" form in FIG. 6; in normal use they would be joined together 706.

Turning now to FIG. 1, we can see the controls that would commonly be present on an embodiment of the remote control handset 1 according to the present invention.

The handset controls are split into two major groups. The first set 2 contains controls that are commonly found on conventional remote control devices, and the second set 3 contains controls specific to the interactive and innovative features of the current invention. Commands generated by the device are sent through as infra-red code sequences through the window 17.

Keypad 4 allows for the selection of channels as desired on the current broadcast receiver device, which in turn may be chosen using the keys 8. Controls 5 allow cycling through channels, and level-set controls 6 provide a means to adjust volume, brightness etc. Finally, there is a subset of other controls 7 which perform various functions, such as turning the target broadcast receiver on and off, muting the device, and so on.

In the set of interactive controls 3, we have a multi-line, pixel addressed LCD display 14 on which display data may be shown. Controls 13 and 15 may be exercised to invoke options shown on the screen, at the bottom and sides respectively. For example, in the configuration shown in FIG. 1, pressing the third triangular button from the left would cause the number of items ordered to increment by 1.

Users may traverse through the set of display data in memory using the forward and back keys 12. Newly displayed PAD items may be announced through the use of a piezoelectric buzzer 11 and a flashing LED 10. The 'lock' button 16, if pressed, removes purchasing authority from the handset until the user re-enters his or her PIN code. The 'Buy Now!' button 9 acts as a confirmation button for the current screen. Where no entry has been made on a screen, pressing button 9 will select the default values, if any.

Pressing some combination of keys (such as any two of 15, for example) will bring up a main, master menu allowing navigation to various subscreens.

Figure 4:
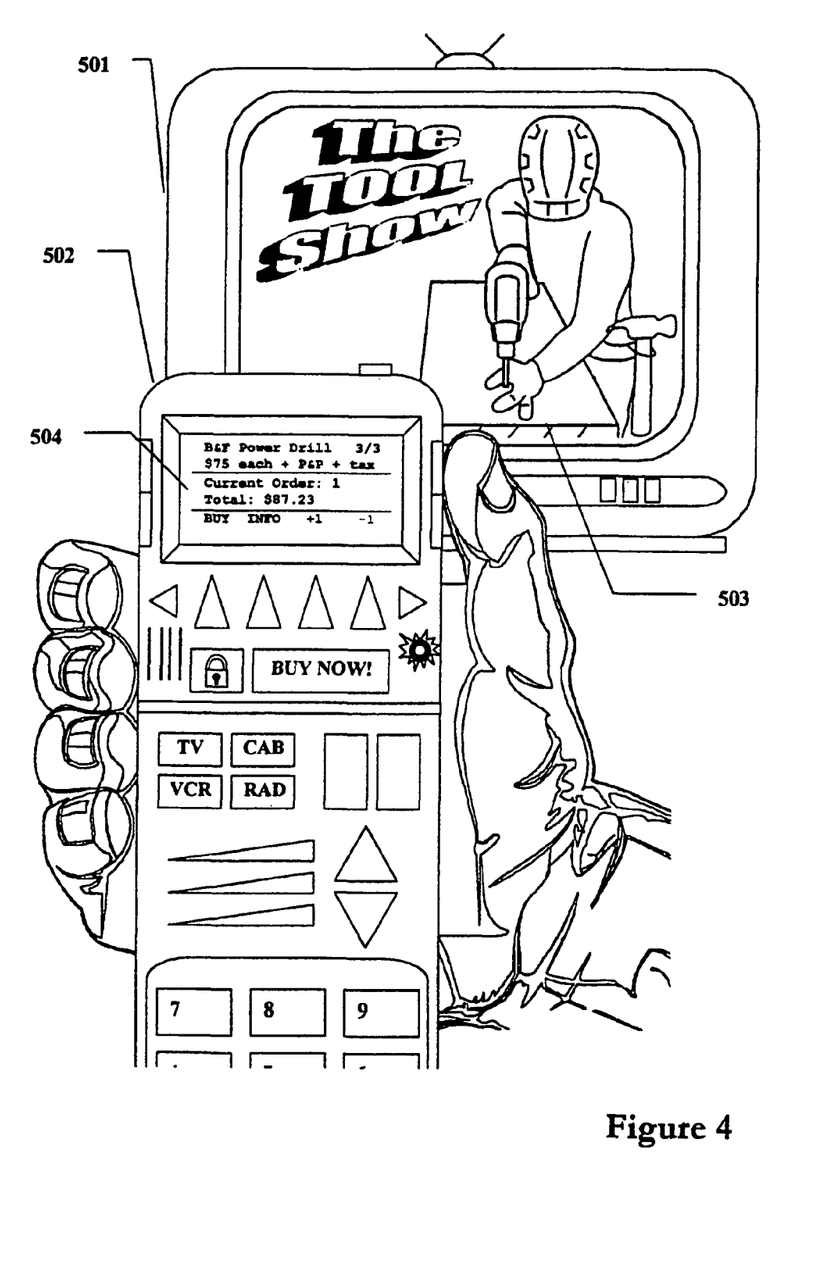
FIG. 4 is illustration of the embodiment of the remote control device of the present invention shown in FIG. 1, as it might be used to offer programme-associated goods.

FIG. 4 illustrates a simple example of an embodiment of the handset remote control device 502 of the present invention in use. Broadcast receiver 501 is displaying a television programme—"The Tool Show"—and as the presenter starts to demonstrate the use of good drilling technique 503, the handset 502 displays a programme-related offer 504 for the drill that the presenter is using. The PAD item corresponding to this offer will have been downloaded to the device from the relevant central processing station 420 (FIG. 3) at some point previously, and cued up at the appropriate point for display by the mechanisms rehearsed above.

In order that a better understanding of some of the uses of the handset remote control device of the present invention may be appreciated, some exemplary displays from one embodiment shall now be considered, with reference to FIGS. 2A through 2L. These displays are intended as illustration only and should not be interpreted as limiting the invention.

Figure 2A:
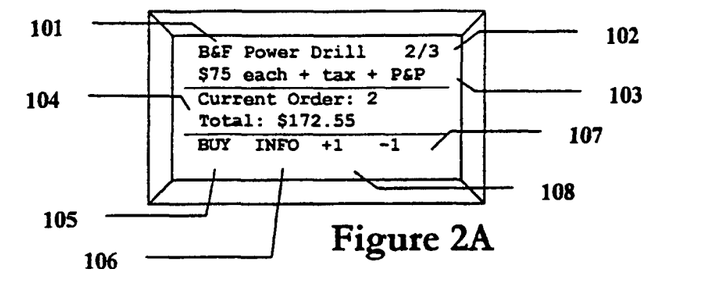
FIGS. 2A through 2L show various exemplary displays of the embodiment of the remote control device of the present invention shown in FIG. 1.

FIG. 2A illustrates the offer screen of the example from FIG. 4, after some interaction. Line 101 contains a brief description of the product, and line 103 gives pricing information. Indicia 102 shows that there are currently 3 PAD items in memory for the current <medium, channel> pair, of which the currently displayed item is the second. Lines 104 give brief information about the current order and the total cost of that order if actually purchased. Below this are indicators of the functions for the variant selector buttons below (13 on FIG. 1). The 'BUY' button 105 will initiate a purchase (similar to pressing the 'BUY NOW!' button, 9 on FIG. 1). The 'INFO' button 106 will bring up a screen giving further information about the offered product. The variable function buttons corresponding to the '+1' and '−1' labels (107 and 108, respectively) increase and decrease the number of units of the product ordered.

Figure 2B:
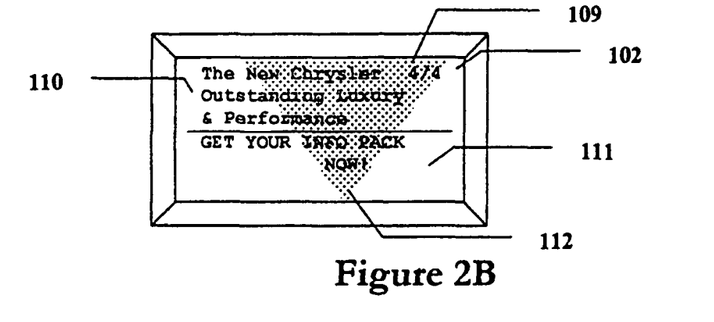
Figure 2C:
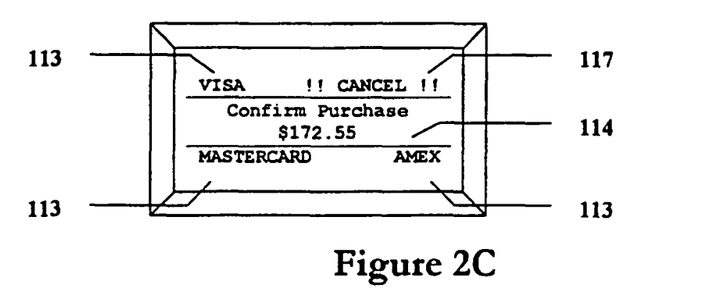

If the user opts to buy, then the screen of FIG. 2C is shown, which contains a request to confirm the transaction 114, a selection of credit and/or debit cards 113 to choose from (chosen by pressing one of the side variable function buttons, 15 on FIG. 1), and the option to cancel the transaction 117. Selecting a credit card will bring up a 'successful order' screen, not shown here.

The screen of FIG. 2B is an example of an offer of information, which might be timed to run alongside an advertisement appearing on the complementary primary broadcast. Here, the user is prompted 109, 111, 112 to press the third from left bottom variable function button (13 on FIG. 1), which will cause a message to be sent back to the sponsor, who will then have the details necessary to send the user an information pack about the product 110. Pressing the 'BUY NOW!' button (9 on FIG. 1) will also have this effect, since it selects the default action on each screen. Once again, we see that the PAD item displayed is one of several 102 (in this case, the last of 4).

Figure 2D:
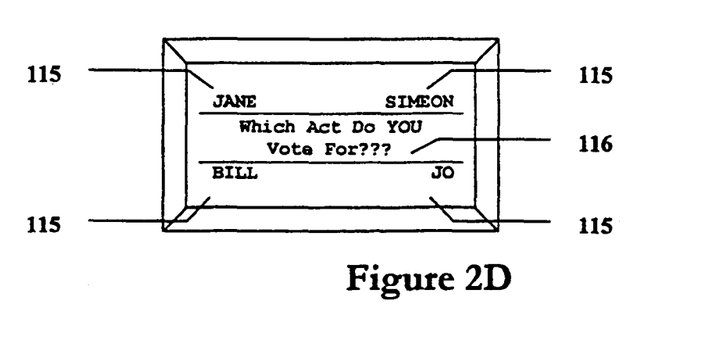

Another use of the system is for interactive voting on broadcast content, and FIG. 2D shows how the display might look when this feature is in use. Here, the user is prompted 116 to enter his/her vote for one of the acts 115 (in a talent show, for example), by pressing one of the side variable function buttons (15 on FIG. 1).

Figure 2E:
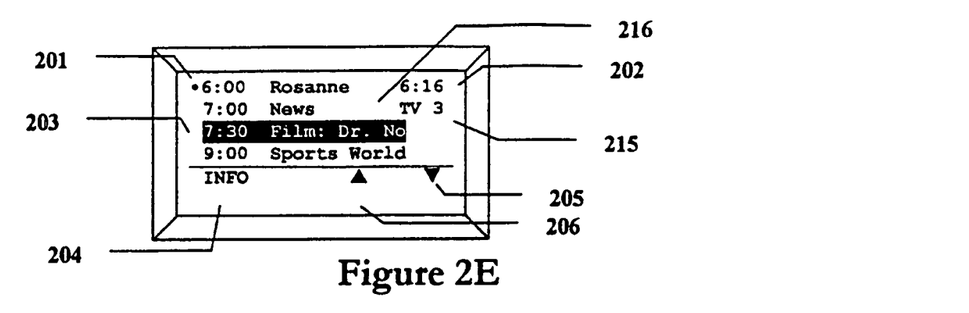

FIG. 2E illustrates a simple channel guide for the currently selected <medium, channel> pair. A short listing of programmes for the current pair, together with start times, is given 216. A cursor 203 may be scrolled up and down the list using the bottom variable function buttons (13 on FIG. 1) corresponding to 206 and 205 respectively; and it is possible to have a list longer than the screen of which a window is displayed during scrolling, in the familiar manner. Indicia 201 shows the programme currently being broadcast. The current time 202 is shown, along with an indication of the current <medium, channel> pair 215 (in this case, the third channel on a television tuner is selected). The currently selected programme may have further information available about it, in which case label 204 will appear, and the bottom variable function button corresponding to it (from 13 on FIG. 1) may be pressed.

Figure 2F:
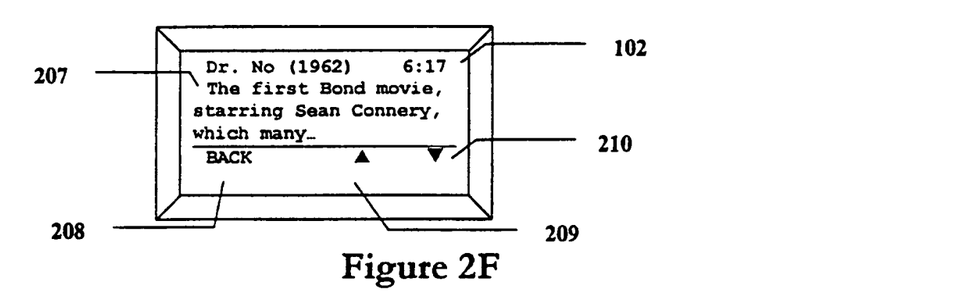

If this is done, a screen such as illustrated in FIG. 2F is displayed. In this instance, information about the selected programme is given 207, and, where this is longer than the screen, the user may scroll up and down through it using the bottom variable function buttons corresponding to labels 209 and 210, respectively. (Note that, in all cases of scrolling, the bottom line containing the function labels remains static). The current time 102 is also shown.

Figure 2G:
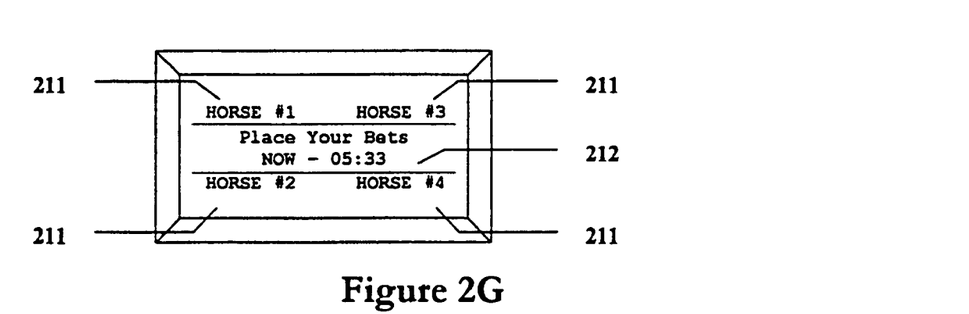

FIG. 2G illustrates how the system may be used as a betting terminal, where the details of the event so bet upon may be broadcast on the currently selected <medium, channel> pair. Here, a simple horse racing screen is shown. The user is prompted to select place a bet and told of the time available so to do 212. Various horses 211 may be selected by pressing the appropriate side variable function button (15 on FIG. 1). Note that this is a simplified example, and in reality, such a system would deal with setting the wager, displaying more information, including a larger number of potential candidates, etc.

Figure 2H:
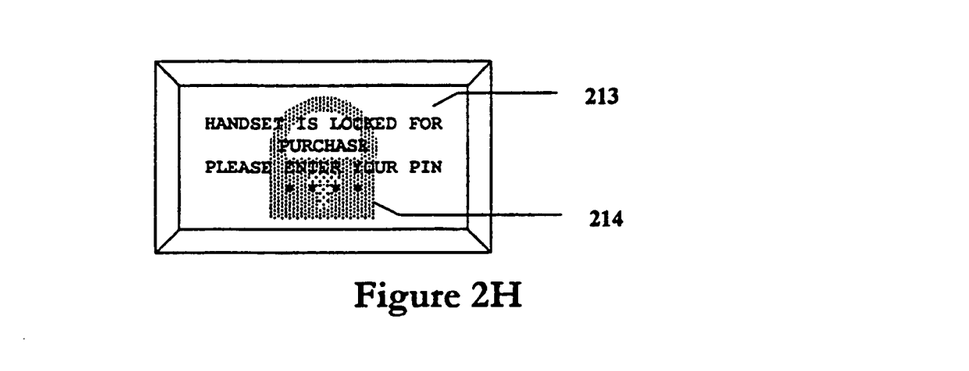

When the handset is locked for purchase, by pressing the 'LOCK' button (16 on FIG. 1) or otherwise, the screen shown is FIG. 2H is displayed when a purchase is attempted. Here, the user is prompted 213 to enter a four-digit PIN 214, which will unlock the device. The device may be set to automatically lock if unused for more than a certain period of time. The PIN will be entered using the keypad (4 on FIG. 1).

Figure 2I:
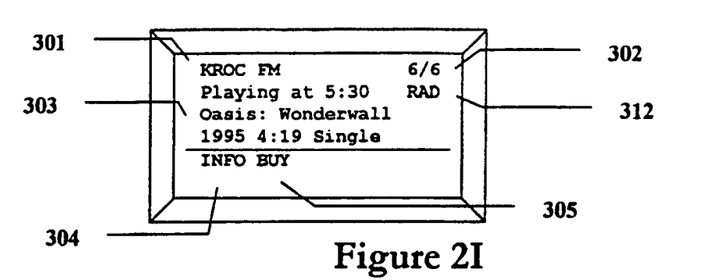
Figure 2J:
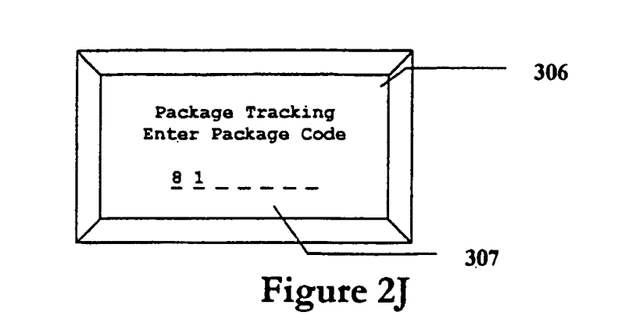
Figure 2K:
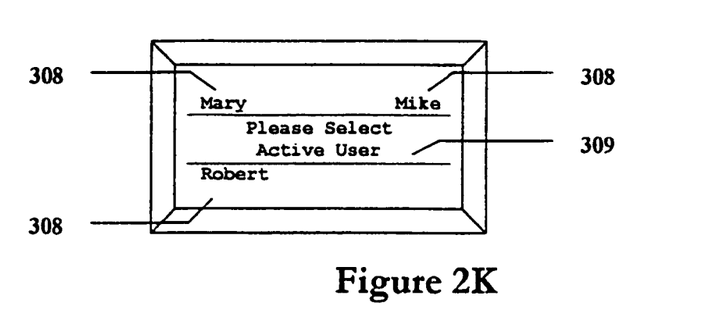

If the handset is powered down or left unused for a significant period of time, it will revert to a mode in which the user identity must be set, as illustrated in FIG. 2K. Here, the handset has three users within a household 308, Mary, Mike, and Robert. The user is prompted to select his or her identity 309 by pressing the corresponding side variable function button (15 in FIG. 1). Once a user is selected, screen 2H may be displayed for verification. The handset device may utilise a capacitative switch to detect handling and initiate the power on cycle.

Figure 7A:
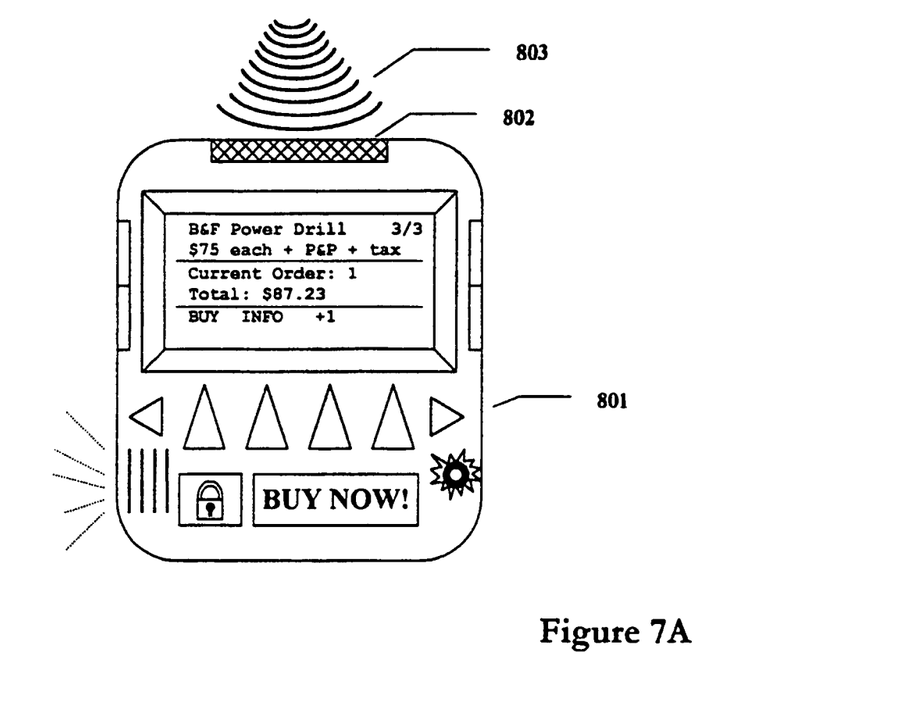
FIG. 7A is a plan view of another alternative embodiment of the present invention, as a device which passively detects the currently selected <medium, channel> pair, and which has no remote control functionality.

In FIG. 7A, we see an alternative embodiment of the current invention, in which no remote control functionality is present. Here, a portable device 801, providing the facilities of the interactive set of controls (3 on FIG. 1) found on the preferred embodiment discussed earlier, and which may also provide conventional pager functionality, contains a microphone 802 by which it continuously monitors its surrounding audio environment. Under normal viewing or listening circumstances, the audio input 803 to microphone 802 will contain a large component due to the programme currently being broadcast on the current <medium, channel> pair.

Having taken a series of audio observations across a short time window, the device performs a sliding match against a set of audio "fingerprints" (which are in turn received periodically from the appropriate central processing station (420 in FIG. 3) via radio link). The matching may use any of the value-series comparison metrics as are known in the art, such as least difference squared summation. If this process yields a unique match to a "fingerprint" of a <medium, channel> pair with sufficient confidence, then that pair will be used to control the current display and acceptance of PAD by the device.

Figure 7B:
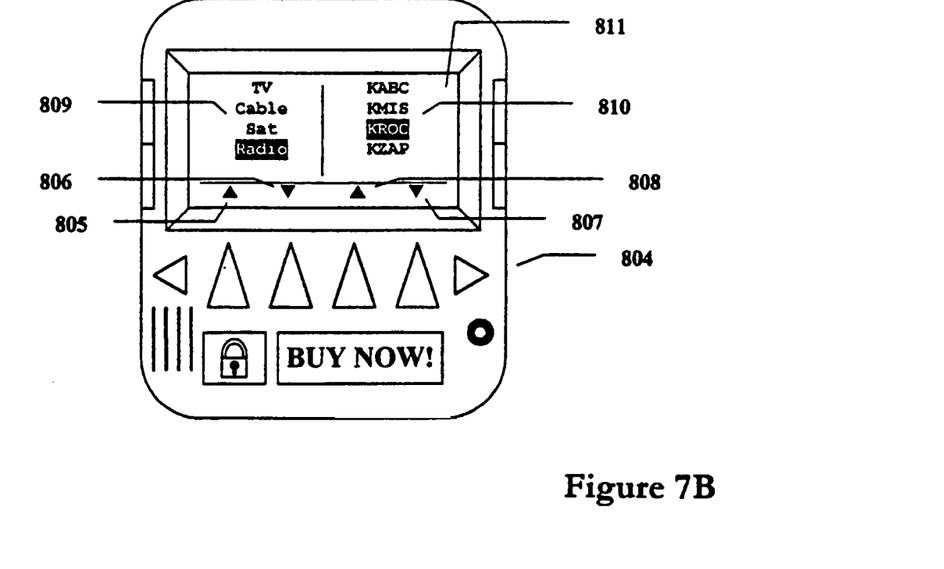
FIG. 7B is a plan view of another alternative embodiment of the present invention, as a more restricted form of the device disclosed in FIG. 7A, which relies on user input to set the current <medium, channel> pair.

FIG. 7B shows another alternative embodiment of the current invention, in which a portable device 804, similar in most respects to the device of FIG. 7A just considered, requires user input to select the current <medium, channel> pair. The user may cause the device to show display 811, in which s/he is prompted to enter the currently selected medium 809 and channel 810. To perform this selection, the user may move the selection cursors using the variable function buttons corresponding to the "medium" up and down and "channel" up and down labels (805, 806, 808 and 807 respectively). The selected pair is subsequently used to control the display and acceptance of PAD by the device, but does not cause the emission of control signals to a broadcast receiver.

The system may be used with a number of different types of broadcast receiver, and FIG. 2I shows the sort of display that might be shown to accompany radio broadcasts. Details of the current station are shown 301, and an indication of the receiver type 312. Brief details of the currently playing song, together with the current time, are given 303. As before, a number of PAD items may be held in memory, and the position of the currently displayed item is shown 302. By pressing the bottom variant function key (13 in FIG. 1) corresponding to the 'INFO' label 304, the user may bring up another screen with more information about the current track (not shown here). Pressing the button corresponding to the 'BUY' label 305, or pressing the 'BUY NOW!' button (9 on FIG. 1) will initiate a purchase of the album or single currently playing. In this case, the user will be prompted with further confirmation screens (not shown in detail here).

Figure 2L:
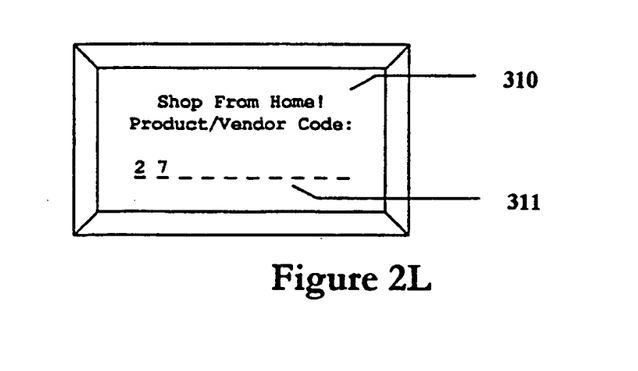

FIGS. 2J and 2L are given to illustrate some other potential uses of the device, less directly connected with programme-associated material. In FIG. 2J the user is prompted 306 to enter a package tracking code 307 (as used by some document and parcel delivery companies), which may then initiate a remote query to display to the user the current location of the specified package (using screens not shown). Similarly, FIG. 2L illustrates a 'shop from home' usage, in which the user is prompted 310 to enter a joint product/vendor identification code 311. This will initiate a remote query to display information about the product so identified, in a manner similar to that used by PAD product offers (as shown in FIG. 2A, for example); if this is successful the user may initiate a purchase, as with the PAD example discussed previously. In both cases, the details would be entered via the keypad (4 in FIG. 1).

Although illustrative embodiments of the present invention have been described in detail with reference to the accompanying drawings, it is to be understood that the invention is not limited to those precise embodiments and that changes and modifications may be made by those skilled in the art without departing from the scope and spirit of the invention.

Moreover, any application or patent cited herein should be considered to be incorporated by reference as to any subject matter deemed essential to the present disclosure.

The invention claimed is:

1. A portable device for controlling a separate broadcast program receiver appliance, comprising:
   (i) a communications interface configured to be connected to a two-way wireless computer network;
   (ii) software instructions configured for accessing, via the communications interface, first program cue data corresponding to a given broadcast program;
   (iii) a receiving module configured for receiving second program cue data from a broadcast signal data, the second program cue data corresponding to a broadcast program accessed at the broadcast program receiver; and
   (iv) a display for visual presentation of incoming data received via the communications interface, wherein the incoming data is sent to the display based upon matching of the first and second program cue data, such that the visual presentation on the display of the portable device has content associated with the content of the broadcast program accessed at the broadcast program receiver,
   wherein the portable device is configured to control the separate broadcast program receiver appliance that is accessing the broadcast program, and to display content associated with the content of the broadcast program accessed at the separate broadcast program receiver.

2. The portable device of claim 1 wherein the second program cue data corresponds to a broadcast program currently accessed at the broadcast program receiver and the visual presentation on the display of the portable device has content associated with the content of the currently accessed broadcast program.

3. The portable device of claim 1 wherein the first and second program cue data includes channel identification data.

4. The portable device of claim 1, wherein the incoming data is independent of the broadcast program broadcast from the broadcaster to the broadcast program receiver.

5. The portable device of claim 1, wherein the portable device is separate from the broadcast program receiver appliance, and the visual presentation on the display of the portable device includes content that is not included in content displayed on the broadcast program receiver appliance.

6. The portable device of claim 1, further comprising software instructions configured for accessing, via the communications interface, a purchase function associated with the displayed data.

7. The portable device of claim 6, wherein the broadcast program includes music audio, and the purchase function is associated with music being broadcast.

8. The portable device of claim 1, further comprising instructions for storing the incoming data in the portable device, and timing the display of the incoming data to correspond to a particular broadcast content.

9. The portable device of claim 8, wherein the particular broadcast content is a particular song.

10. The portable device of claim 8, wherein the particular broadcast content is a pre-designated portion of a video broadcast.

11. The portable device of claim 8, wherein the particular broadcast content is a pre-designated portion of an audio broadcast.

12. A portable device for controlling a separate broadcast program receiver appliance, comprising:
   (i) a communications interface configured to be connected to a two-way wireless computer network (ii) software instructions configured for accessing, via the communications interface, first program data corresponding to a given broadcast program;

(iii) a receiving module configured for receiving second program data from a broadcast signal data, the second program data corresponding to a broadcast program accessed at the broadcast program receiver; and (iv) a display for visual presentation of incoming data received via the communications interface, wherein the incoming data is sent to the display based upon matching of the first and second program data, such that the visual presentation on the display of the portable device has content associated with the content of the broadcast program accessed at the broadcast program receiver, wherein the portable device is configured to control the separate broadcast program receiver appliance that is accessing the broadcast program, and to display content associated with the content of the broadcast program accessed at the separate broadcast program receiver.

13. The portable device of claim 12, wherein the second program data corresponds to a broadcast program currently accessed at the broadcast program receiver and the visual presentation on the display of the portable device has content associated with the content of the currently accessed broadcast program.

14. The portable device of claim 12, wherein the first and second program data includes channel identification data.

15. The portable device of claim 12, wherein the incoming data is independent of the broadcast program broadcast from the broadcaster to the broadcast program receiver.

16. The portable device of claim 12, wherein the portable device is separate from the broadcast program receiver appliance, and the visual presentation on the display of the portable device includes content that is not included in the content of the broadcast program accessed at the broadcast program receiver appliance.

17. The portable device of claim 12, further comprising software instructions configured for accessing, via the communications interface, a purchase function associated with the displayed data.

18. The portable device of claim 17, wherein the broadcast program includes music audio, and the purchase function is associated with music being broadcast.

19. The portable device of claim 12, further comprising instructions for storing the incoming data in the portable device, and timing the display of the incoming data to correspond to a particular broadcast content.

20. The portable device of claim 19, wherein the particular broadcast content is a particular song.

21. The portable device of claim 19, wherein the particular broadcast content is a pre-designated portion of a video broadcast.

22. The portable device of claim 19, wherein the particular broadcast content is a pre-designated portion of an audio broadcast.

* * * * *